United States Patent
Kelly et al.

(10) Patent No.: US 10,822,234 B2
(45) Date of Patent: Nov. 3, 2020

(54) METHOD AND SYSTEM FOR OXYGEN TRANSPORT MEMBRANE ENHANCED INTEGRATED GASIFIER COMBINED CYCLE (IGCC)

(71) Applicant: Praxair Technology, Inc., Danbury, CT (US)

(72) Inventors: Sean M. Kelly, Pittsford, NY (US); Shrikar Chakravarti, East Amherst, NY (US); Raymond F. Drnevich, Clarence Center, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 420 days.

(21) Appl. No.: 15/304,290

(22) PCT Filed: Apr. 9, 2015

(86) PCT No.: PCT/US2015/025052
§ 371 (c)(1),
(2) Date: Oct. 14, 2016

(87) PCT Pub. No.: WO2015/160609
PCT Pub. Date: Oct. 22, 2015

(65) Prior Publication Data
US 2017/0044013 A1 Feb. 16, 2017

Related U.S. Application Data

(60) Provisional application No. 61/980,149, filed on Apr. 18, 2014.

(51) Int. Cl.
*C01B 3/48* (2006.01)
*C01B 3/38* (2006.01)
(Continued)

(52) U.S. Cl.
CPC ........ *C01B 3/48* (2013.01); *B01J 7/02* (2013.01); *C01B 3/38* (2013.01); *C01B 3/382* (2013.01);
(Continued)

(58) Field of Classification Search
CPC ..... C01B 3/48; C01B 3/38; C01B 3/382; B01J 7/02

See application file for complete search history.

(56) References Cited

U.S. PATENT DOCUMENTS 2,593,507 A 4/1952 Wainer
2,692,760 A 10/1954 Flurschutz
(Continued)

FOREIGN PATENT DOCUMENTS

DE 10330859 A1 2/2004
DE 102004038435 A1 2/2006
(Continued)

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.
(Continued)

*Primary Examiner* — Paul A Wartalowicz
(74) *Attorney, Agent, or Firm* — Ralph J. Mancini

(57) ABSTRACT

A system and method for oxygen transport membrane enhanced Integrated Gasifier Combined Cycle (IGCC) is provided. The oxygen transport membrane enhanced IGCC system is configured to generate electric power and optionally produce a fuel/liquid product from coal-derived synthesis gas or a mixture of coal-derived synthesis gas and natural gas derived synthesis gas.

6 Claims, 8 Drawing Sheets

(51) Int. Cl.
*C10J 3/48* (2006.01)
*C01B 13/02* (2006.01)
*F01K 23/06* (2006.01)
*C10K 3/02* (2006.01)
*B01J 7/02* (2006.01)

(52) U.S. Cl.
CPC .......... *C01B 3/386* (2013.01); *C01B 13/0251* (2013.01); *C10J 3/485* (2013.01); *C10K 3/02* (2013.01); *F01K 23/067* (2013.01); *C01B 2203/0233* (2013.01); *C01B 2203/0244* (2013.01); *C01B 2203/0261* (2013.01); *C01B 2203/0283* (2013.01); *C01B 2203/0415* (2013.01); *C01B 2203/06* (2013.01); *C01B 2203/062* (2013.01); *C01B 2203/127* (2013.01); *C01B 2203/1241* (2013.01); *C01B 2203/141* (2013.01); *C01B 2203/143* (2013.01); *C01B 2203/84* (2013.01); *C01B 2203/86* (2013.01); *C10J 2300/093* (2013.01); *C10J 2300/1612* (2013.01); *C10J 2300/1653* (2013.01); *Y02E 20/18* (2013.01); *Y02P 30/00* (2015.11)

(56) References Cited

U.S. PATENT DOCUMENTS

| | | |
|---|---|---|
| 3,282,803 A | 11/1966 | Poepel et al. |
| 3,317,298 A | 5/1967 | Klomp et al. |
| 3,468,647 A | 9/1969 | Buyers et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,631,915 A * | 12/1986 | Frewer ............... C07C 29/1518 518/703 |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,432,705 A | 7/1995 | Severt et al. |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| 6,191,573 B1 | 2/2001 | Noda |
| RE37,134 E | 4/2001 | Wilson |
| 6,214,066 B1 | 4/2001 | Nataraj et al. |
| 6,214,314 B1 | 4/2001 | Abbott |
| 6,268,075 B1 | 7/2001 | Autenrieth et al. |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,355,093 B1 | 3/2002 | Schwartz et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |

(56) References Cited

U.S. PATENT DOCUMENTS

| | | |
|---|---|---|
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 2002/0073938 A1 | 6/2002 | Bool et al. |
| 2002/0078906 A1 | 6/2002 | Prasad et al. |
| 2002/0141920 A1 | 10/2002 | Alvin et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0135324 A1 | 7/2004 | Brule et al. |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0019827 A1 | 1/2006 | Whittenberger |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0063659 A1 | 3/2006 | Xue et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0072949 A1* | 3/2007 | Ruud .................. B01D 53/229 518/702 |
| 2007/0082254 A1 | 4/2007 | Hiwatashi |
| 2007/0104793 A1 | 5/2007 | Akash |
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0245897 A1 | 10/2007 | Besecker et al. |
| 2007/0289215 A1 | 12/2007 | Hemmings et al. |
| 2007/0292342 A1 | 12/2007 | Hemmings et al. |
| 2007/0292742 A1 | 12/2007 | Hemmings et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0142148 A1 | 6/2008 | Nielsen et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 4/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0018394 A1 | 1/2010 | Ekiner et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz et al. |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0203238 A1 | 8/2010 | Magno et al. |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0020192 A1 | 1/2011 | Baumann et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0241672 A1 | 10/2011 | Repasky |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0067210 A1 | 3/2012 | Sane et al. |
| 2012/0194783 A1 | 11/2012 | Palamara et al. |
| 2012/0288439 A1 | 11/2012 | Sundaram et al. |
| 2013/0009100 A1 | 1/2013 | Kelly et al. |
| 2013/0009102 A1 | 1/2013 | Kelly et al. |
| 2013/0015405 A1 | 1/2013 | Quintero |
| 2013/0072374 A1 | 3/2013 | Lane et al. |
| 2013/0072375 A1 | 3/2013 | Lane et al. |

(56) References Cited

U.S. PATENT DOCUMENTS

| | | |
|---|---|---|
| 2013/0156958 A1 | 6/2013 | Belov et al. |
| 2013/0258000 A1 | 10/2013 | Ohashi et al. |
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner |
| 2014/0231351 A1 | 8/2014 | Wickramasinghe et al. |
| 2014/0319424 A1 | 10/2014 | Chakravarti et al. |
| 2014/0319427 A1 | 10/2014 | Chakravarti et al. |
| 2014/0323597 A1 | 10/2014 | Stuckert et al. |
| 2014/0323598 A1 | 10/2014 | Chakravarti et al. |
| 2014/0323599 A1 | 10/2014 | Chakravarti et al. |
| 2015/0096506 A1 | 4/2015 | Kelly et al. |
| 2015/0098872 A1 | 4/2015 | Kelly et al. |
| 2015/0226118 A1 | 8/2015 | Kelly et al. |
| 2015/0328582 A1 | 11/2015 | Joo et al. |
| 2016/0001221 A1 | 1/2016 | Lu et al. |
| 2016/0118188 A1 | 4/2016 | Wada |
| 2016/0155570 A1 | 6/2016 | Shimada et al. |

FOREIGN PATENT DOCUMENTS

| | | |
|---|---|---|
| EP | 0 663 231 A2 | 7/1995 |
| EP | 0926096 A1 | 6/1999 |
| EP | 0984500 A2 | 3/2000 |
| EP | 0989093 A2 | 3/2000 |
| EP | 1504811 A1 | 2/2005 |
| EP | 1717420 A1 | 11/2006 |
| EP | 1743694 A1 | 1/2007 |
| EP | 2 098 491 A1 | 9/2009 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1 312 700 | 4/1973 |
| GB | 1348375 | 3/1974 |
| JP | 56-136605 | 10/1981 |
| WO | WO 97/41060 | 11/1997 |
| WO | WO 2011/020192 A1 | 11/1997 |
| WO | WO 9842636 | 10/1998 |
| WO | WO 0017418 | 3/2000 |
| WO | WO 0109059 A1 | 2/2001 |
| WO | WO 2004/063110 A2 | 7/2004 |
| WO | WO 2006/064160 A1 | 6/2006 |
| WO | WO 2007/060141 | 5/2007 |
| WO | WO 2007/086949 | 8/2007 |
| WO | WO 2007/092844 A2 | 8/2007 |
| WO | WO 2008/024405 | 2/2008 |
| WO | WO 2009/027099 A1 | 3/2009 |
| WO | WO 2010/052641 A2 | 5/2010 |
| WO | WO 2011/083333 A1 | 7/2011 |
| WO | WO 2011/121095 A2 | 10/2011 |
| WO | WO 2012/118730 | 9/2012 |
| WO | WO 2013/009560 A1 | 1/2013 |
| WO | WO 2013/062413 A1 | 5/2013 |
| WO | WO 2013/089895 A1 | 6/2013 |
| WO | WO 2014/049119 A1 | 4/2014 |
| WO | WO 2014/074559 A1 | 5/2014 |
| WO | WO 2014/077531 A1 | 5/2014 |
| WO | WO 2014/107707 A2 | 7/2014 |
| WO | WO 2014/160948 A1 | 10/2014 |
| WO | WO 2014/176022 A1 | 10/2014 |

OTHER PUBLICATIONS

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

Lee Rosenet al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

The U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Friedemann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a CO2 Recovery Power Plant by Burning Pulverized Coal in O2/CO2 , Energy Conyers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

M. Solvang, K.A. Nielsen, and P.H. Larsen, "Optimization of Glass Ceramic Sealant for Intermediate Temperature Solid Oxide Fuel Cells", Jan. 1, 2005, XP055352985, Retrieved from the Internet: URL:http://ma.ecsdl.org/content/MA2005-01/30/1206.full.pdf on Mar. 8, 2017.

VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf retrieved on Mar. 9, 2017.

Jian-jun Liu, Tong Liu, Wen-dong Wang, Jian-feng Gao, Chu-sheng Chen; Zr0.84Y0.16O1.92-La0.8Sr0.2Cr0.5Fe0.5O3-δ dual-phase composite hollow fiber membrane targeting chemical reactor applications; Journal of Membrane Science 389 (2012) 435-440.

\* cited by examiner

METHOD AND SYSTEM FOR OXYGEN TRANSPORT MEMBRANE ENHANCED INTEGRATED GASIFIER COMBINED CYCLE (IGCC)

RELATED APPLICATIONS

This application is a U.S. National Stage Application of PCT/US2015/025052, filed on Apr. 9, 2015, which claims priority to U.S. Provisional Application Ser. No. 61/980,149, filed on Apr. 16, 2014, which is incorporated herein by reference.

FIELD OF THE INVENTION

The present invention provides a method and system for producing a synthesis gas mixture, and more particularly for producing electric power and/or a liquid product from a coal-derived synthesis gas and optionally from a mixture of the coal-derived synthesis gas and natural gas derived synthesis gas produced from a reactively-driven oxygen transport membrane based reforming reactor or converter.

BACKGROUND

The Integrated Gasifier Combined Cycle (IGCC) is a well-known and documented cycle utilizing coal feedstock, oxygen from a cryogenic air separation unit, and steam/water input to create a synthesis gas that can be cooled, cleaned up, and used in a gas turbine and HRSG arrangement for power production. The cleaned synthesis gas can be subjected to a water-gas shift reaction to increase the hydrogen content, then a solvent system such as Selexol™ or MDEA can be used to capture and remove the carbon dioxide for sequestration while the concentrated hydrogen gas stream can be directed to the gas turbine. In prior art IGCC systems, the hydrogen fuel directed to the gas turbine is preferably diluted with nitrogen gas from the cryogenic air separation unit process to achieve a lower heating value in the range of about 120 btu/scf to facilitate operation of the gas turbine.

However, the IGCC cycle is a very costly system that includes high operating costs as well as high capital costs due, in part, to the large cryogenic air separation unit required to supply the oxygen required for the IGCC process and nitrogen diluents for the hydrogen-rich synthesis gas fueled gas turbines as well as the water-gas shift reactors required to facilitate carbon dioxide removal and production of hydrogen-rich fuel for the gas turbines. In addition, many IGCC plants or systems operate at a reduced level of carbon conversion of the coal-derived synthesis gas requiring larger carbon capture and sequestration (CCS) systems.

Accordingly, there is a continuing need to enhance the performance and cost effectiveness of the coal-based IGCC systems and processes. In addition, there is a long-standing need to improve the economics of prior art IGCC systems so as to commercially enable liquids synthesis as an IGCC plant co-product or to commercially enable a coal-to-liquids application.

Several concepts for CCS enabled coal power plants have been considered using oxygen transport membrane technology. One such concept is the advanced power cycle where oxygen transport membrane process heaters, synthesis gas expanders, and an oxygen transport membrane based boiler/steam cycle are employed as shown in FIG. 1 and FIG. 2 and generally described in U.S. Pat. Nos. 7,856,829 and 8,196,387. In this oxygen transport membrane based process of FIG. 1, coal is first gasified in an oxygen-blown gasifier to generate coal-derived synthesis gas. The coal-derived synthesis gas is heated in an oxygen transport membrane-fired process heater to raise its temperature before being expanded in a hot synthesis gas expander to generate electrical power. The synthesis gas may then be reheated and expanded in one or more subsequent stages until adequate power is recovered from the high pressure coal-derived synthesis stream. The reduced pressure synthesis gas is then sent to one or more oxygen transport membrane-fired boiler process units where the majority of oxy-combustion and heat conversion to power takes place. FIG. 2 is a prior art version of the advanced power cycle using a natural gas based oxygen transport membrane based reforming reactor and oxygen transport membrane based boiler In these prior art oxygen transport membrane based power generation systems, the oxygen transferred across the membrane elements is supplied from low pressure heated air and reacts with a portion of the synthesis gas fuel. Since the rate of oxygen transport is limited by the availability of the membrane area, the oxidation of synthesis gas will take place over a large area within the boiler. As the synthesis gas gets oxidized, the driving force for oxygen transport will decrease and the required membrane area per unit of oxygen will increase. For practical reasons, the oxygen transport membrane will be used to supply oxygen to the fuel side until about 80-90% fuel combustion is achieved. The remainder of fuel will be combusted using oxygen supplied from the cryogenic air separation unit (ASU) which also supplies oxygen to the coal gasifier.

After the coal-derived synthesis gas fuel is completely oxidized with externally supplied and cryogenically produced oxygen, the flue gas will pass through a convective section of the boiler for further steam generation and boiler feed water preheating. The flue gas exiting the boiler is processed according to a purification process for a conventional oxy-fuel technology. Detailed techno-economic evaluation of this CCS power plant at 550 MW rating has shown the ability to displace at least 70% of the cryogenically-derived oxygen from the process, while achieving a carbon capture cost of less than $40/ton, and increasing the cost of electricity by less than 40% versus non-CCS pulverized coal powerplant.

The use of oxygen transport membrane (OTM) systems have also been contemplated in connection with boilers to generate steam used to produce electricity, as disclosed in U.S. patent application Ser. No. 14/138,619. This advanced power cycle system and method for generating electrical power uses a high pressure synthesis gas stream that is partially oxidized in an oxygen transport membrane based reactor, expanded and thereafter, is combusted in an oxygen transport membrane based boiler. The combustion within the boiler generates heat to raise steam to in turn generate electricity by a generator coupled to a steam turbine. The resultant flue gas can be purified to produce a carbon dioxide product.

Praxair has also recently developed various concepts and systems around synthesis gas production, methanol production, and Fischer-Tropsch liquids production with oxygen transport membrane technology using natural gas in a combined reformer configuration (See for example, U.S. patent application Ser. Nos. 14/078,897; 14/081,403; 14/078,859 and United States provisional patent application Ser. Nos. 61/910,697 and 61/948,249 the disclosures of which are incorporated by reference herein. In addition, use of the oxygen transport membrane technology with natural gas in a combined reformer configuration (e.g. primary reformer/ secondary reformer configuration) alone, or together with a coal derived synthesis gas has been shown and described in U.S. provisional patent application Ser. No. 61/939,029, the disclosure of which is incorporated by reference herein.

What is still needed, however, is a commercially viable way of integrating natural gas based oxygen transport membrane technology with coal-derived synthesis gas. Successful integration would enable enhanced carbon conversion of coal synthesis gas while reducing the overall oxygen requirement from the cryogenic air separation unit as well as the steam input to the coal gasifier, with the additional oxygen and higher temperature secondary reforming occurring within an oxygen transport membrane based reactor or converter.

SUMMARY OF THE INVENTION

The present invention in one or more aspects can be characterized as an oxygen transport membrane based hydrogen-rich fuel gas production system comprising: (i) a coal gasification subsystem configured to produce a coal-derived synthesis gas stream from a source of coal, steam and a first oxygen stream; (ii) a reactively driven oxygen transport membrane based conversion subsystem configured to treat the coal-derived synthesis gas stream with at least a second oxygen stream to form a hydrogen-rich effluent stream; and (iii) a gas conditioning subsystem configured to treat the hydrogen-rich effluent stream to produce the hydrogen-rich fuel gas. The first oxygen stream is provided by separation of oxygen from air at cryogenic temperatures whereas the second oxygen stream is provided by separation of oxygen from air at elevated temperatures within the oxygen transport membrane based conversion subsystem and wherein the mass of the second oxygen stream divided by the total mass of the first and second oxygen streams is in the range of 0.1 to 0.7.

Alternatively, the present invention may be characterized as an oxygen transport membrane based power generation system comprising: (i) a coal gasification subsystem configured to produce a coal-derived synthesis gas stream from a source of coal, steam and a first oxygen stream; (ii) an oxygen transport membrane based conversion subsystem configured to treat the coal-derived synthesis gas stream and reform a separate hydrocarbon feed stream with at least a second oxygen stream to form a hydrogen-rich effluent stream; wherein the oxygen transport membrane based conversion subsystem further comprises a combined reforming reactor configured to react the hydrocarbon containing feed stream and steam to form the hydrocarbon-derived synthesis gas stream; and (iii) a gas conditioning subsystem configured to treat the hydrogen-rich effluent stream to provide a hydrogen-rich fuel gas to a gas turbine. The first oxygen stream is provided from a source that separates oxygen from air at cryogenic temperatures whereas the second oxygen stream is provided by separation of oxygen from air at elevated temperatures within the oxygen transport membrane based conversion subsystem. The coal-derived synthesis gas stream input into the oxygen transport membrane based conversion system contains at least 5.0 volume % hydrocarbons and the hydrogen-rich effluent stream contains less than about 2.0 volume % hydrocarbons.

The present invention may further be characterized as an oxygen transport membrane based co-products system comprising: (i) a coal gasification subsystem configured to produce a coal-derived synthesis gas stream from a source of coal, steam and a first oxygen stream; (ii) an oxygen transport membrane based conversion subsystem configured to treat the coal-derived synthesis gas stream, a hydrocarbon containing feed stream and steam with at least a second oxygen stream to form a hydrogen-rich effluent stream; (iii) a gas conditioning subsystem configured to treat the hydrogen-rich effluent stream to provide a hydrogen-rich fuel gas; (iv) a gas turbine system configured to combust the hydrogen-rich fuel gas and generate electricity; and (v) a steam turbine configured to generate electricity from steam produced by the recovered heat in gas turbine exhaust gas. The first oxygen stream is provided from a source that separates oxygen from air at cryogenic temperature and the second oxygen stream is provided by separation of oxygen from air at elevated temperature within the oxygen transport membrane based conversion subsystem. The coal-derived synthesis gas stream treated in the oxygen transport membrane based conversion system contains at least 1.0 volume % hydrocarbons and the hydrogen-rich effluent stream contains less than about 2.0 volume % hydrocarbons.

In several other aspects, the present invention may be characterized as a method or methods for producing a hydrogen-rich fuel gas or as an oxygen transport membrane based converter assembly as generally set forth in the appended claims.

Advantageously, the addition of an oxygen transport membrane based subsystem allows for reduced oxygen input from the first oxygen stream to the coal gasifier and increased carbon conversion of the synthesis gas. In other words, there is less methane slip, and more hydrogen for power production.

Supplementing the coal-derived synthesis gas with a natural gas derived synthesis gas produced in a primary reformer, the mixture or combination of coal-derived synthesis gas and natural gas derived synthesis gas can be subjected to a conversion or secondary reforming reaction within the oxygen transport membrane based reforming reactor or converter. Such secondary reforming or conversion uses oxygen transport membrane supplied oxygen to oxidize a portion of the hydrogen and carbon monoxide in the synthesis gas. The heat and reaction products generated therefrom facilitate the secondary reforming or conversion of any unreacted methane in the mixed synthesis gas feed. As the amount of natural gas input increases relative to the coal feed, the total fraction of oxygen input to the system or plant provided by the oxygen transport membrane increases and the oxygen input provided by the air separation unit to the system decreases. Using the natural gas based oxygen transport membrane enhanced IGCC system and process, more hydrogen is produced per unit of carbon for power-generation in the context of carbon capture.

Also, since coal-derived synthesis gas is generally deficient of hydrogen, the use of coal-derived synthesis gas for liquid synthesis using a Fischer-Tropsch is economically challenging. To overcome this challenge, many prior art systems require a water-gas-shift reactor to facilitate increasing the hydrogen content and improve liquid synthesis economics. A portion of the shifted synthesis gas is added to the pre-shift coal-derived synthesis gas to produce the desired $H_2/CO$ ratio of about 2.0 for Fischer-Tropsch liquid synthesis. However, using the above-described natural gas based oxygen transport membrane enhanced system and process, production of a Fischer-Tropsch liquid becomes economically feasible without hydrogen addition to the synthesis gas. In particular, at a critical level of natural gas input, the $H_2/CO$ ratio of the reacted synthesis gas approaches the value of 2.0 without hydrogen addition and no shifted gas needs to be diverted to facilitate the Fischer-Tropsch synthesis.

BRIEF DESCRIPTION OF THE DRAWINGS

The above and other aspects, features, and advantages of the present invention will be more apparent from the following, more detailed description thereof, presented in conjunction with the following drawings, in which.

DETAILED DESCRIPTION

Figure 1:
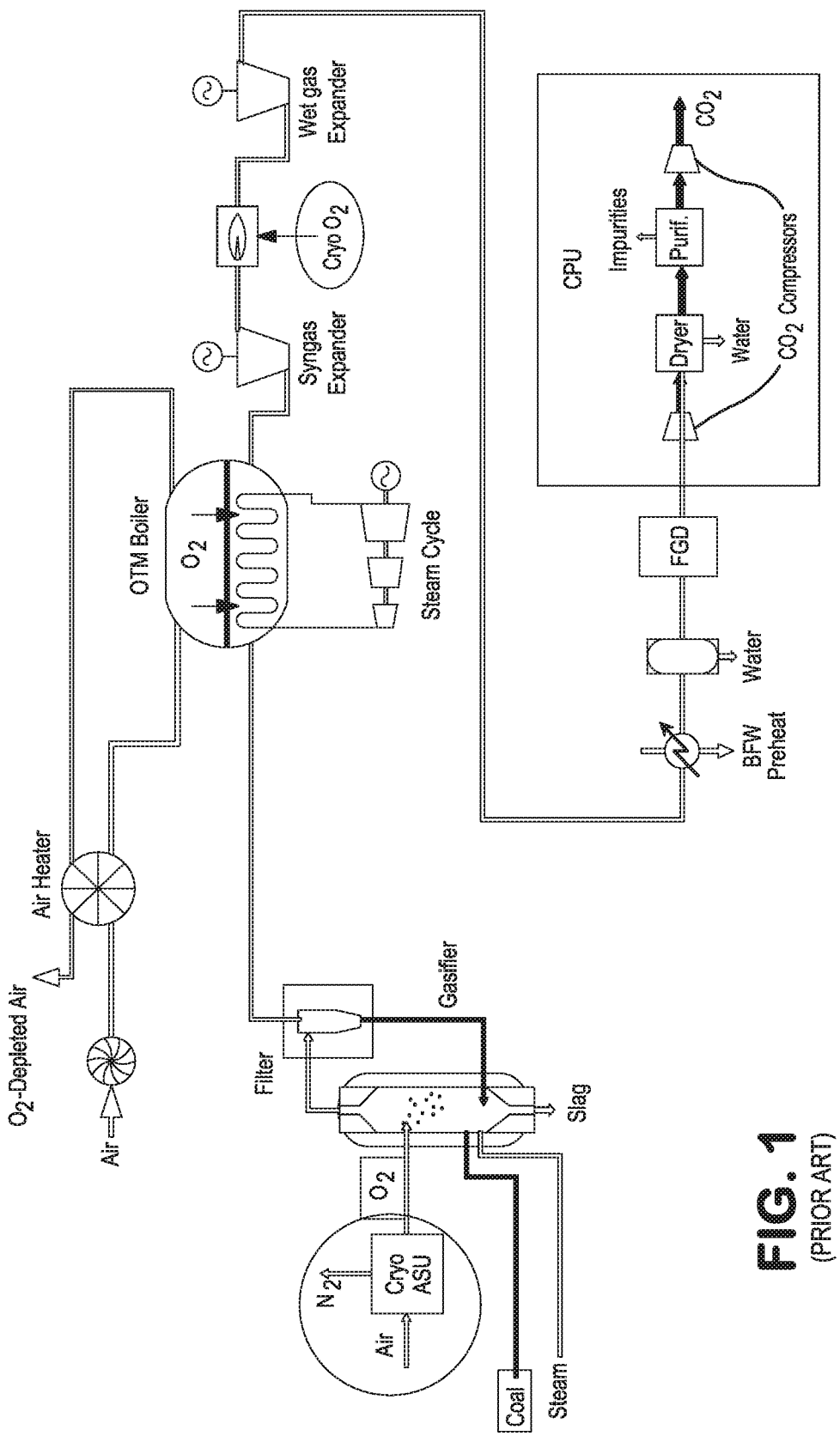
FIG. 1 shows a schematic illustration of a prior art advanced power cycle with carbon capture for producing electric power from a coal-derived synthesis gas using an oxygen transport membrane based boiler.
Figure 2:
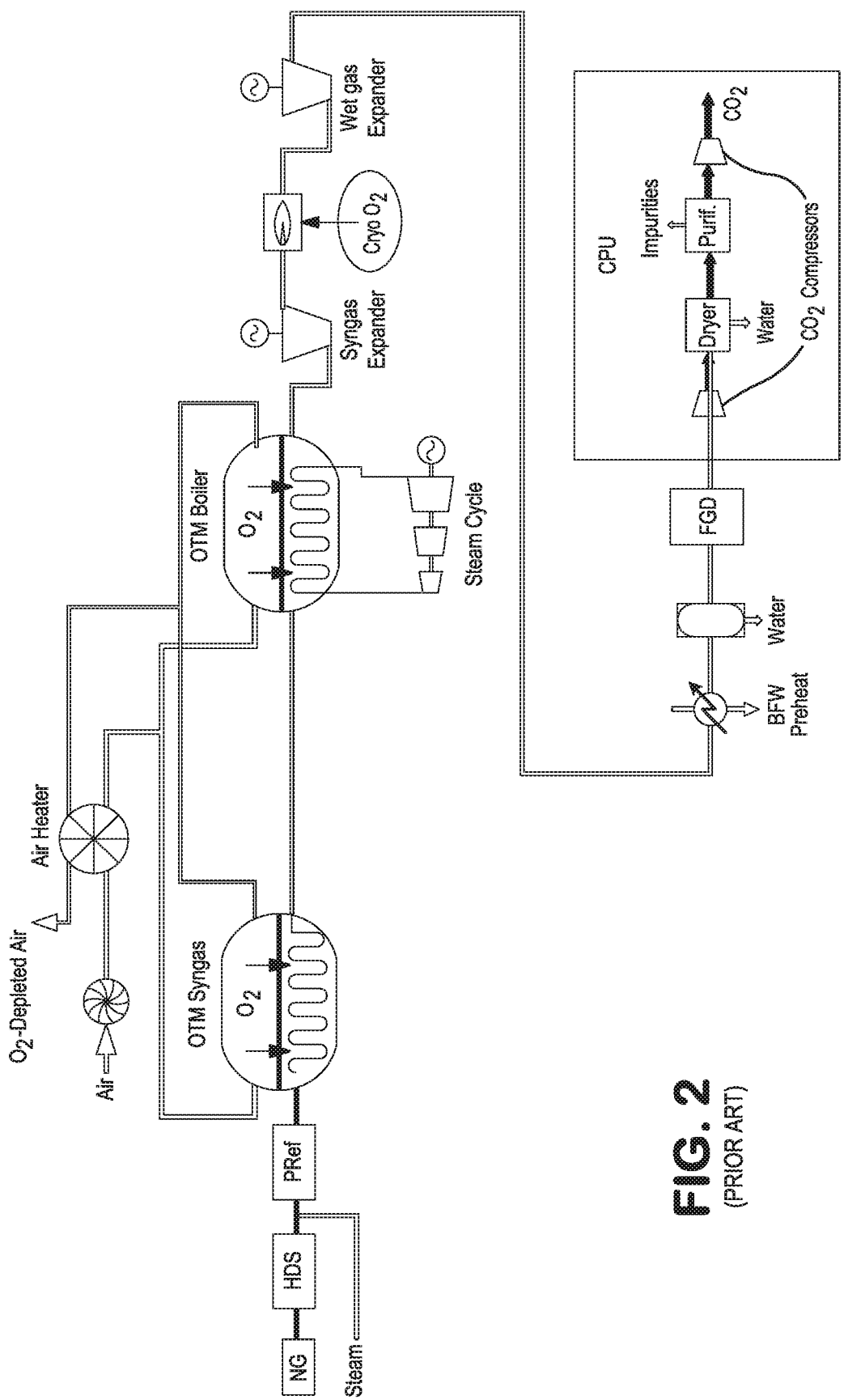
FIG. 2 shows a schematic illustration of a prior art advanced power cycle with carbon capture for producing electric power from a natural gas based oxygen transport membrane based reforming reactor and oxygen transport membrane based boiler.
Figure 3:
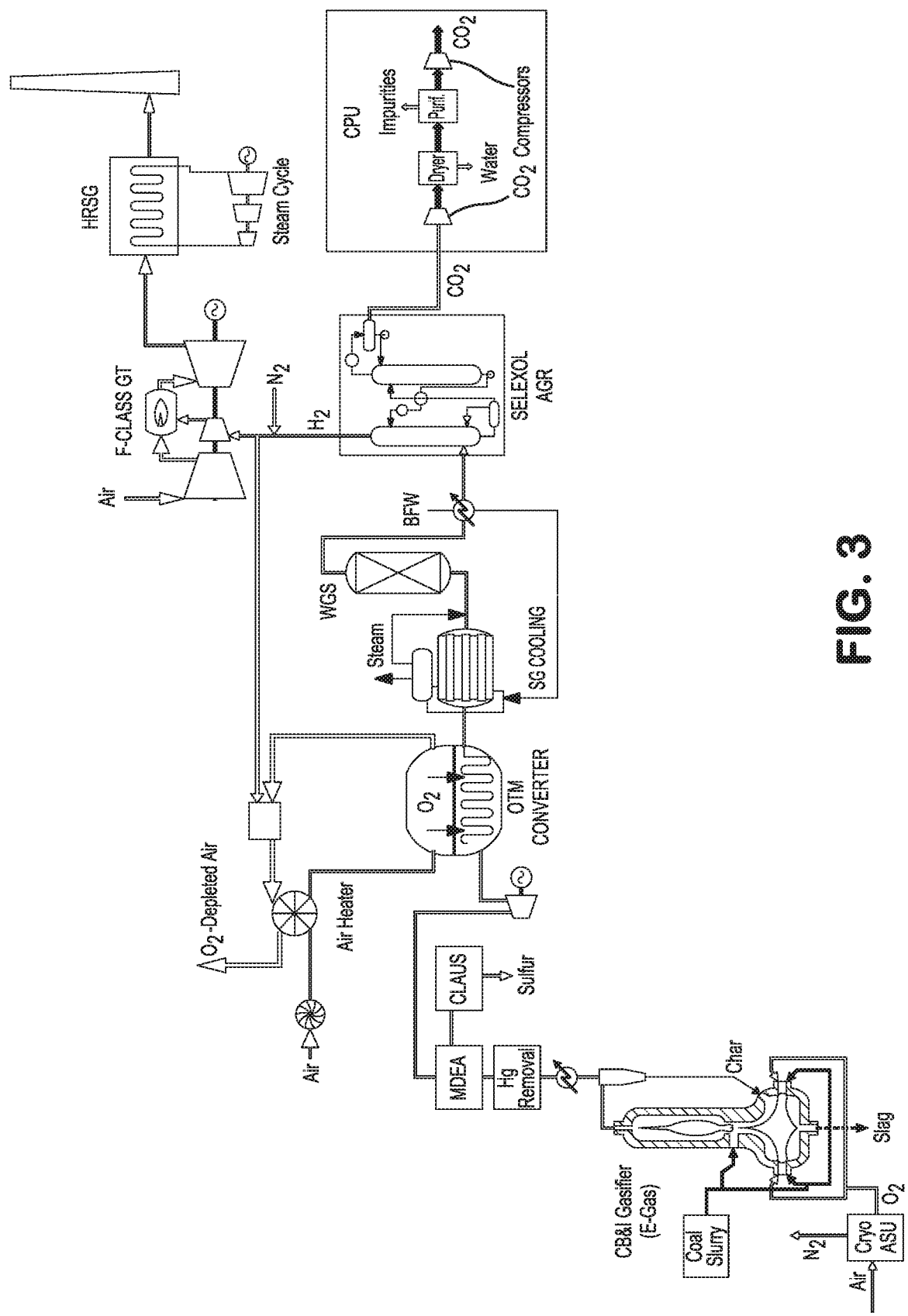
FIG. 3 shows a schematic illustration of a IGCC method and system with carbon capture for producing electric power from a coal-derived synthesis gas using an oxygen transport membrane based reforming reactor or converter in accordance with an embodiment of the invention.

Turning now to FIG. 3, there is shown a schematic illustration of one embodiment of the present oxygen transport membrane enhanced IGCC method and system that generates electric power from a coal-derived synthesis gas that is upgraded using an oxygen transport membrane based reforming reactor or converter. The oxygen transport membrane enhanced IGCC system comprises: (i) a coal gasification subsystem, preferably comprising an entrained flow coal gasifier, configured for generating a source of coal-derived synthesis gas; (ii) an oxygen transport membrane based subsystem containing an oxygen transport membrane based reforming reactor or converter configured for upgrading the quality of the coal-derived synthesis gas produced in the coal gasification subsystem; (iii) an air intake subsystem configured for supplying a heated air feed stream to the oxygen transport membrane based reforming reactor or converter; (iv) a synthesis gas conditioning subsystem that preferably includes a heat recovery train, a water-gas shift reactor, a synthesis gas separation and purification unit, and a carbon dioxide purification unit; and (v) a power generating subsystem.

A key feature of the present system and method is the oxygen transport membrane based reforming reactor or converter. This converter is essentially an oxygen-blown secondary reformer, but it operates without a cryogenically produced oxygen supply. In this arrangement, the oxygen transport membrane based converter serves to further react the coal-derived synthesis gas at high temperatures effectively increasing the amount of carbon that is converted to carbon monoxide, and subsequently utilized to shift water vapor to hydrogen with resulting carbon dioxide available for capture. With this secondary conversion in the oxygen transport membrane enhanced IGCC system, the coal gasifier may be operated with reduced cryogenically produced oxygen input relative to the coal input.

Figure 4:
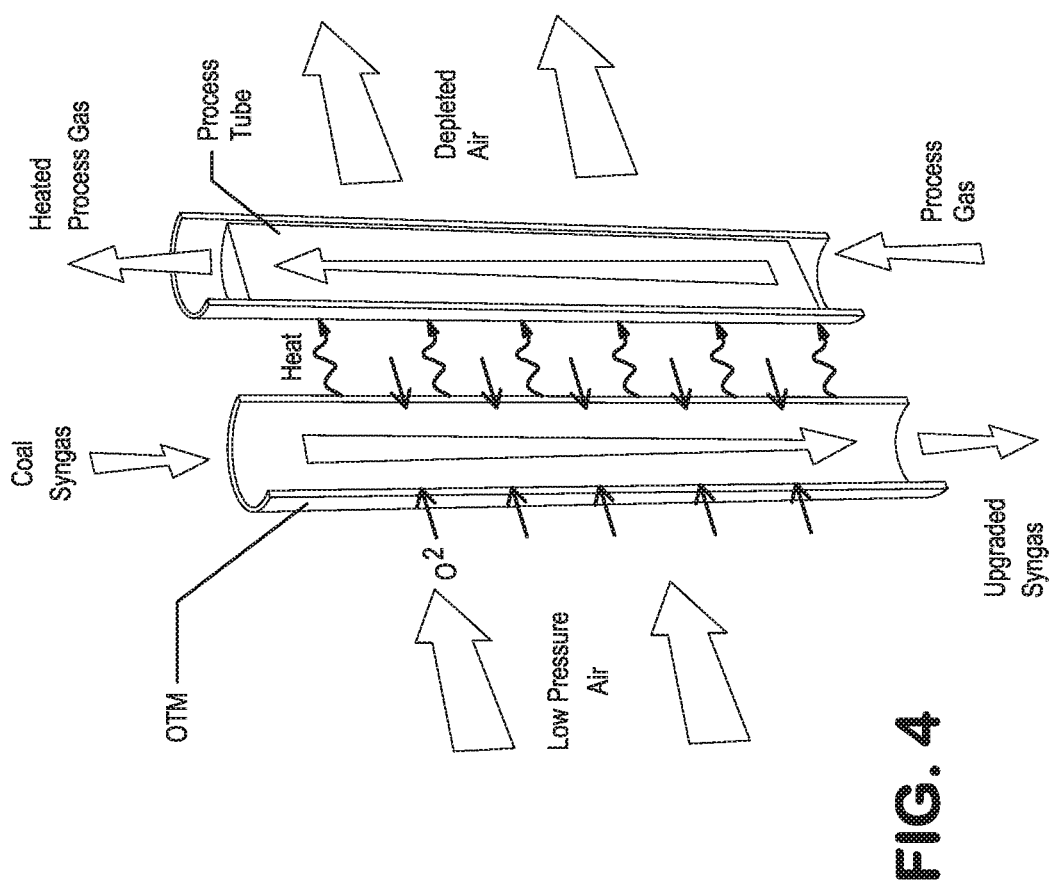
FIG. 4 shows an illustration of the oxygen transport membrane based reforming reactor or converter suitable for use with the embodiment of FIG. 3.

FIG. 4 depicts the preferred oxygen transport membrane based reforming reactor or converter configured to upgrade or convert the coal-derived synthesis gas produced in the coal gasification subsystem of FIG. 3. In this embodiment, the synthesis gas from the coal gasification subsystem is directed to the reactant side of the oxygen transport membrane reactor or converter after clean-up and desulfurization of the coal-derived synthesis gas. The oxygen transport membrane oxidizes a portion of the hydrogen and carbon monoxide with pure oxygen transported through the membrane to the reactant side releasing heat and producing some reaction products, namely $H_2O$ and carbon dioxide. In the presence of a suitable reforming catalyst and the heat generated by the oxidation process, residual methane present in the coal-derived synthesis gas converts to additional hydrogen and carbon monoxide while some $H_2O$ and carbon dioxide converts to hydrogen and carbon monoxide through steam-methane reforming, reverse water-gas shift, and dry-reforming reactions. Because of the high operating temperatures (e.g. 1000° C.) associated with the oxygen transport membrane the upgraded synthesis gas will equilibrate with a low methane slip (i.e. <1% by volume), and a higher content of carbon monoxide and hydrogen than the coal-derived synthesis gas fed to the oxygen transport membrane converter. As indicated above, oxygen transport membrane converter, integrated with a catalyst, operates much like an oxygen-blown secondary reformer; however, the source of oxygen is from a low-pressure air supply on the oxidant side of the membrane elements, and the heat for the reactions is provided by the oxidation of a portion of the hydrogen and carbon monoxide in the synthesis gas with pure oxygen transported through the membrane. In this mode, if there is an excess heat, it may be transferred via radiative heat transfer to a suitable load in the form of a process gas passing through adjacent heating tubes. The process gas can be a synthesis gas, steam, or any other suitable gas that requires preheating or reheating to a temperature in the 300° C. to 850° C. range.

Figure 5:
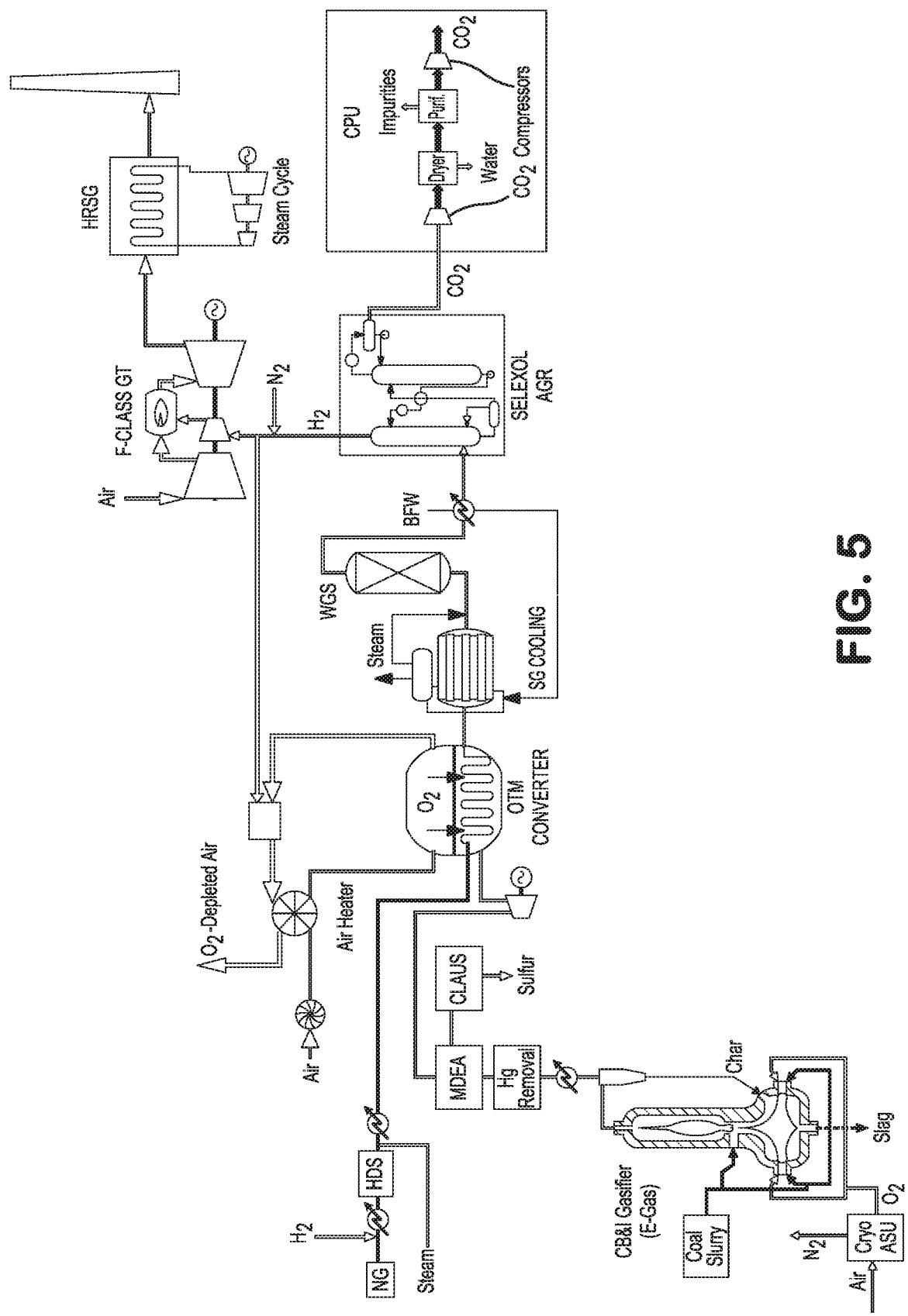
FIG. 5 shows a schematic illustration of an oxygen transport membrane enhanced IGCC method and system with carbon capture for producing electric power from a mixture of a coal-derived synthesis gas and natural gas based synthesis gas produced from an oxygen transport membrane based reforming reactor or converter in accordance with another embodiment of the invention.

Turning now to FIG. 5, there is shown another embodiment of the present oxygen transport membrane enhanced IGCC method and system that generates electric power from a mixture of coal-derived synthesis gas and natural gas derived synthesis gas. The oxygen transport membrane enhanced IGCC system comprises: (i) a coal gasification subsystem, preferably comprising an entrained flow coal gasifier, configured for generating a source of coal-derived synthesis gas; (ii) a natural gas and steam combined feed subsystem adapted for providing a natural gas feed and steam feed to the oxygen transport membrane enhanced IGCC system; (iii) an oxygen transport membrane based subsystem configured for reforming the natural gas feed, mixing the natural gas derived synthesis gas with the coal-derived synthesis gas, and upgrading the mixed synthesis gas in an oxygen transport membrane based converter; (iv) an air intake subsystem configured for supplying a heated air feed stream to the oxygen transport membrane based reforming reactor or converter; (v) a synthesis gas conditioning subsystem that preferably includes a heat recovery train, a water-gas shift reactor, a synthesis gas separation and purification unit, and a carbon dioxide purification unit; and (vi) a power generating subsystem.

Figure 6:
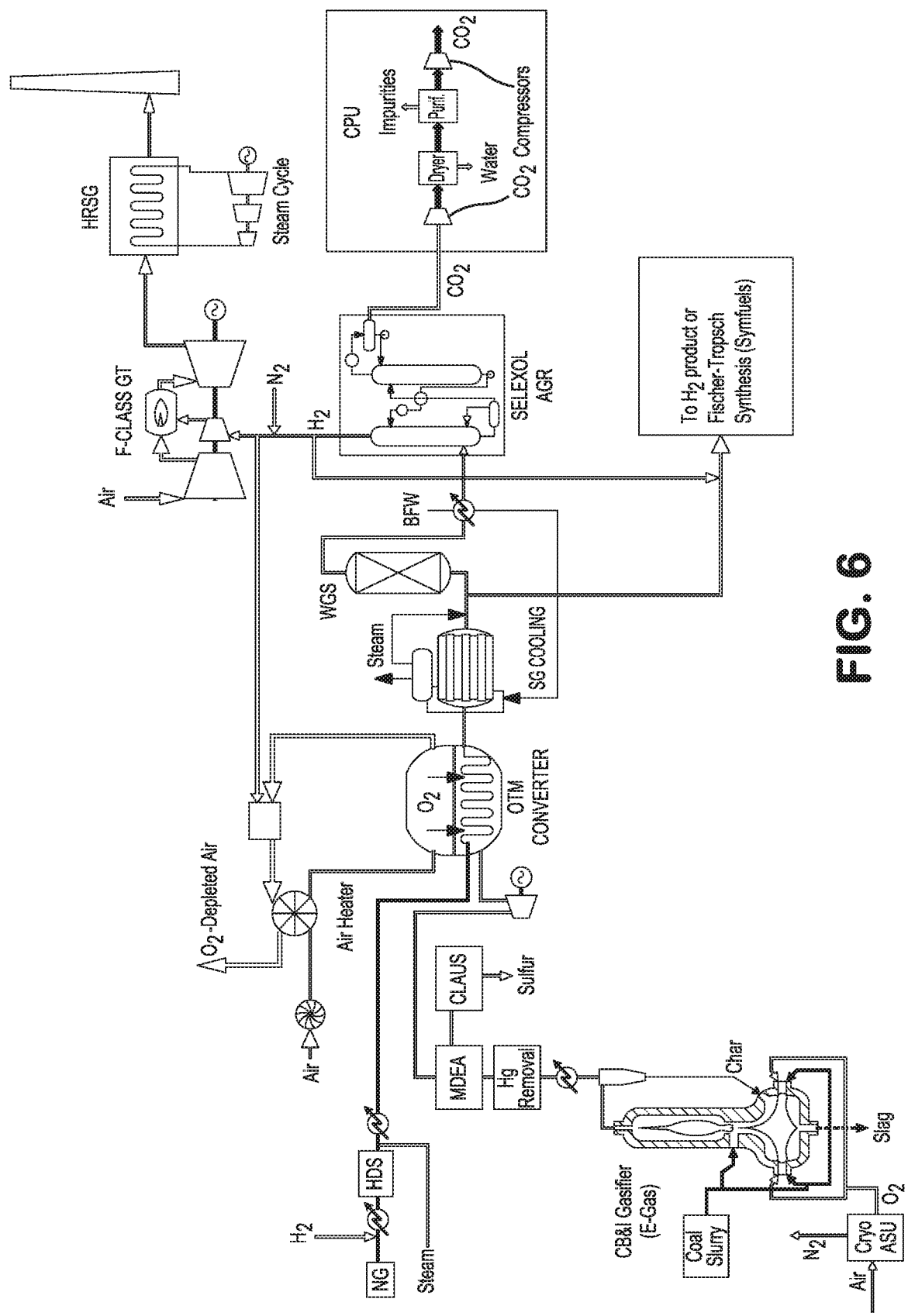
FIG. 6 shows a schematic illustration of an oxygen transport membrane enhanced IGCC method and system with carbon capture for synthesizing a fuel/liquid product and producing electric power using a mixture of a coal-derived synthesis gas and natural gas based synthesis gas produced from an oxygen transport membrane based reforming reactor or converter in accordance with yet another embodiment of the invention.

FIG. 6 shows yet another embodiment of the present oxygen transport membrane enhanced IGCC method and system that is specifically configured or adapted to produce co-products including a fuel/liquid product, preferably in a Fischer-Tropsch synthesis process, and electric power from a mixture of coal-derived synthesis gas and natural gas derived synthesis gas. The oxygen transport membrane enhanced IGCC system shown in FIG. 6 comprises: (i) a coal gasification subsystem, preferably comprising an entrained flow coal gasifier, configured for generating a source of coal-derived synthesis gas; (ii) a natural gas and steam combined feed subsystem adapted for providing a natural gas feed and steam feed to the oxygen transport membrane enhanced IGCC system; (iii) an oxygen transport membrane based subsystem configured for reforming the natural gas feed, mixing the natural gas derived synthesis gas with the coal-derived synthesis gas, and upgrading the mixed synthesis gas in an oxygen transport membrane based converter; (iv) an air intake subsystem configured for supplying a heated air feed stream to the oxygen transport membrane based reforming reactor or converter; (v) a synthesis gas conditioning subsystem that preferably includes a heat recovery train, a water-gas shift reactor, a synthesis gas separation and purification unit, and a carbon dioxide purification unit; (vi) a power generating subsystem; and (vii) a liquid/fuel product synthesis subsystem.

In the arrangements described with reference to FIG. 5 and FIG. 6, both coal and natural gas feedstocks may be used for increased efficiency and lower carbon dioxide emitting combined cycle plants within a framework of proven and available carbon dioxide capture technology. Additionally, for Fischer-Tropsch synthetic fuels or methanol synthesis, synthesis gas produced from coal is generally hydrogen deficient, and synthesis gas produced from natural gas is generally hydrogen rich. Blending the synthesis gas derived from both fuel sources allows for more flexibility and efficiency with respect to achieving the ideal synthesis gas characteristics to support downstream liquid product synthesis.

Figure 7:
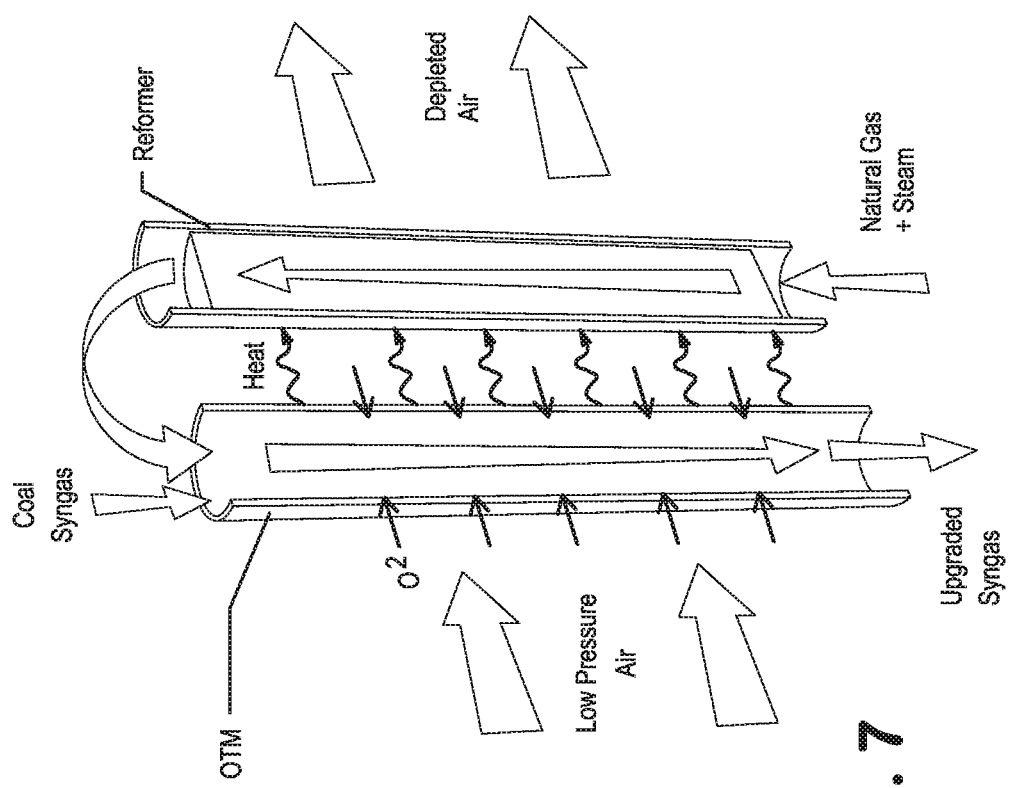
FIG. 7 shows an illustration of the oxygen transport membrane based reforming reactor or converter suitable for use with the embodiments of FIG. 5 and FIG. 6.
Figure 8:
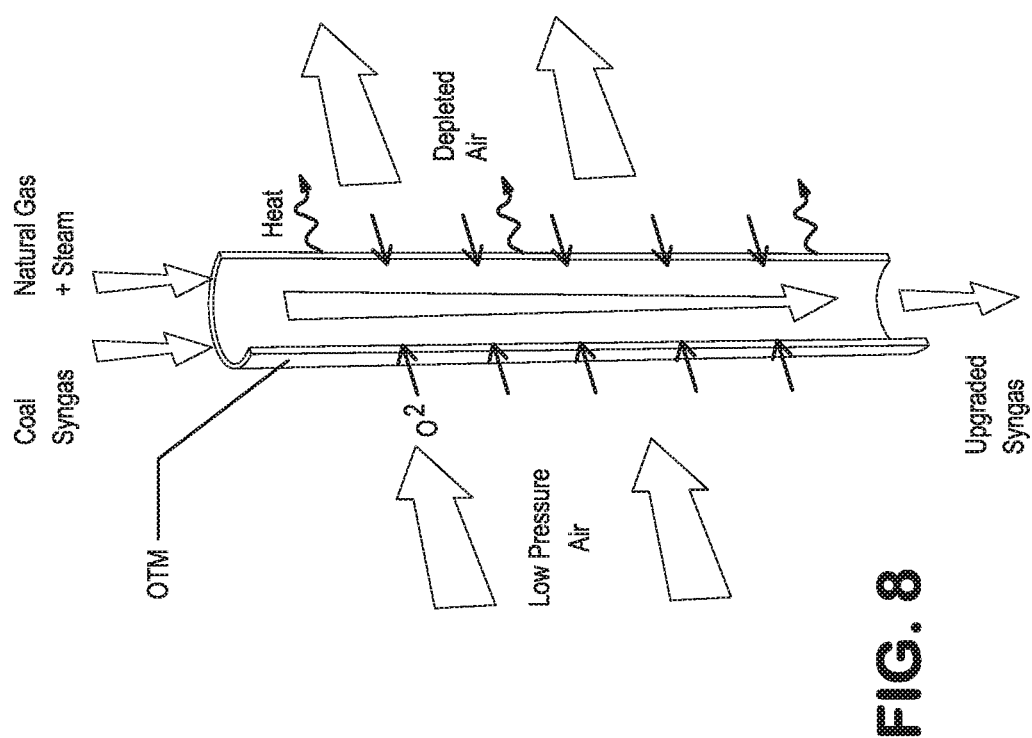
FIG. 8 shows an illustration of the oxygen transport membrane based reforming reactor or converter suitable for use with the embodiments of FIG. 5 and FIG. 6.

FIG. 7 and FIG. 8 depict preferred arrangements or embodiments of the preferred oxygen transport membrane based reforming reactor or converter configured or adapted for use in the natural gas based oxygen transport membrane enhanced IGCC systems shown in FIG. 5 and FIG. 6. As with the earlier described embodiments, the coal-derived synthesis gas from the coal gasification subsystem is directed to the reactant side of the oxygen transport membrane based reforming reactor or converter after clean-up and desulfurization of the coal-derived synthesis gas. The combined feed stream comprising natural gas and steam, on the other hand, is directed to either a reforming tube (FIG. 7) or to the reactant side of the oxygen transport membrane based reforming reactor (FIG. 8) where it is mixed with the cleaned and desulfurized synthesis gas from the coal gasification subsystem.

Within the oxygen transport membrane based reforming reactor or converter shown in FIG. 7, a portion of the hydrogen and carbon monoxide in the mixed synthesis gas is oxidized with pure oxygen transported through the membrane to the reactant side releasing heat and producing some reaction products, namely $H_2O$ and carbon dioxide. In the presence of a suitable reforming catalyst disposed within the oxygen transport membrane reforming tube and the heat generated by the oxidation reaction, the residual methane present in the mixed synthesis gas stream is converted to additional hydrogen and carbon monoxide while some $H_2O$ and carbon dioxide converts to hydrogen and carbon monoxide through steam-methane reforming, reverse water-gas shift, and dry-reforming reactions.

In the embodiment of FIG. 7, process tubes are loaded with a reforming catalyst and are configured to convert or reform the natural gas with steam in the presence of radiant heat provided from the oxygen transport membrane elements or tubes. Since these reforming tubes operate at lower temperatures (i.e. 750° C. to 900° C.) than the oxygen transport membrane elements or tubes, the natural gas-derived synthesis gas produced in the reforming tubes will contain a significant amount of methane slip. This natural gas derived synthesis gas is combined with the coal-derived synthesis gas and this mixed synthesis gas stream is upgraded or converted using the oxygen transport membrane based reactor or converter, as generally described above with reference to FIG. 4. In this arrangement, the coal and cryogenically produced oxygen input to the cycle is further reduced compared to the coal-only embodiment of FIG. 3, while obtaining the same amount of hydrogen fuel to be supplied to the gas turbines, and with lower amounts of carbon dioxide produced for capture.

In the embodiment of FIG. 8, a portion of the hydrogen and carbon monoxide in the coal-derived synthesis gas is oxidized with pure oxygen transported through the membrane to the reactant side also releasing heat and producing some reaction products. In the presence of a suitable reforming catalyst disposed within the oxygen transport membrane reforming tube and the heat generated by the oxidation reaction, the residual methane present in the coal-derived synthesis gas stream and the methane in the natural gas based combined feed stream are converted to hydrogen and carbon monoxide through various reactions including steam-methane reforming. The embodiment of FIG. 8 simulates a near autothermal reforming type operation and would require sufficient catalyst activity such that the coal-derived synthesis gas, together with the natural gas and steam feed may be converted within the oxygen transport membrane reforming tube in a once-through arrangement. In this arrangement, where Fischer-Tropsch synthesis is to be supported, the hydrogen post shift and acid gas removal or separation can be combined with the pre-shift synthesis gas to achieve the desired $H_2/CO$ ratio of about 2.0. As the natural gas input is increased, progressively less hydrogen is required to be separated and blended back to the synthesis gas to support Fischer-Tropsch liquids synthesis. This results in still more carbon and hydrogen from the feedstock available for conversion to liquid product, and less hydrogen liberated for power recovery, and less carbon dioxide produced for capture.

The coal-derived synthesis gas when reacted in the oxygen transport membrane based converter or secondary reformer can be utilized in the same mode as traditional IGCC system configurations with or without carbon capture and sequestration (CCS). The further addition of a primary reformer using natural gas and steam upstream of the oxygen transport membrane based converter or secondary reformer, would enable the production of a mixed synthesis gas with higher $H_2/CO$ ratio that can be produced for: (i) use solely in the enhanced IGCC power generation process with or without CCS; (ii) use solely in a Fischer-Tropsch liquids synthesis process; or (iii) an IGCC power generation (with or without CCS) and with a Fischer-Tropsch liquids co-product; or (iv) an IGCC power generation (with or without CCS) and with a Fischer-Tropsch liquids off-peak product.

Elements of each of the above-described subsystems shown in FIG. 3, FIG. 5 and FIG. 6 together with operational aspects of each subsystem are disclosed in detail below.

Coal Gasifier Subsystem

Various embodiments of the present inventions contemplate the use of a conventional coal gasification subsystem as generally shown in FIGS. 3, 5 and 6. In a typical coal gasification subsystem, a pulverized coal feedstock is fed to a gasification unit along with steam and oxygen supplied from a cryogenic air separation unit. In the disclosed embodiments, the cryogenic air separation unit is preferably a commercially available low purity, low to intermediate pressure air separation unit, known to those persons skilled in the art cryogenic air separation plants, although more complex air separation units can be employed to meet other industrial gas requirements of the plant or facility.

In practice, the coal gasification unit may comprise a single coal gasification reactor or a plurality of reactors connected in a series of stages which collectively achieve the desired coal gasification, that is, the formation of a coal-derived synthesis gas stream. Preferably, the coal gasification unit is an entrained flow, fixed bed, or fluidized bed coal gasifier. In the coal gasification process, the steam and oxygen injected into the coal beds result in the partial oxidation of the coal at temperatures between about 750° C. and 1500° C. and pressures of between about 300 psia and 1000 psia. At these high temperatures and pressurized conditions, the molecular bonds of coal and steam are broken down, releasing a raw synthesis gas stream that contains at least hydrogen and carbon monoxide and which also typically contains other substances such as carbon dioxide, water vapor, hydrocarbons, volatilized tars, particulate matter, and sulfides. The portions of the coal feedstock which are not transformed into raw synthesis gas may become a slag material that resembles glass, sulfur byproducts or ammonia. There is also some ash generally formed in the coal gasifier which is removed later in the gasification process. The tars, oils, phenols, ammonia and water co-products are preferably condensed from the raw synthesis gas stream and purified, as appropriate. The synthesis gas is then directed to a filter or cleaning area where further impurities are removed. The resulting coal-derived synthesis gas is typically at a temperature of between about 500° C. and 1000° C. and at a pressure of between about 300 psia and 1000 psia.

For some of the embodiments presented in this invention, the preferred coal gasifier type may be the entrained flow gasifier. Operating pressures for entrained flow coal gasifiers (e.g. those made by General Electric, Conoco Phillips, Shell, Siemens, etc.) typically range from 300 to 1500 psig and more typically from 500 to 1100 psig. In this case, coal may be fed in dry particulate form or may be mixed with water and fed as a slurry to the gasifier.

The coal-derived synthesis gas may require a pretreatment subsystem for $H_2S$ and COS control that is disposed downstream of the coal gasifier and upstream of the oxygen transport membrane based reforming reactor or converter. The preferred coal-derived synthesis gas pretreatment process is solvent-based (MDEA) sulfur removal process, although a warm gas cleanup process using a solid regenerable sorbent may alternatively be used.

Natural Gas and Steam Combined Feed Subsystem

As shown in FIG. 5 and FIG. 6, the natural gas feed stream to be reformed within the oxygen transport membrane enhanced IGCC system is typically preheated in one or more heat exchangers that serve as a natural gas feed preheaters. Also, since the natural gas typically contains unacceptably high level of sulfur species, the natural gas feed stream undergoes a sulfur removal process such as hydro-desulfurization (HDS). HDS is a catalytic chemical process widely used to remove sulfur from the natural gas feedstock. To facilitate the desulfurization, a small amount of hydrogen or hydrogen-rich gas is added to natural gas feed upstream of the heat exchangers. Further, since the natural gas based mixed feed stream generally contains some higher hydrocarbons that will break down at high temperatures to form unwanted carbon deposits that adversely impact the reforming process, the natural gas based mixed feed stream may optionally be pre-reformed in an adiabatic pre-reformer (not shown), which converts higher hydrocarbons present in the mixed feed stream to methane, hydrogen, carbon monoxide, and carbon dioxide. An alternative pre-reformer suitable for use with the present embodiments would be a heated pre-reformer that is thermally coupled with the oxygen transport membrane based reforming subsystem.

Steam is then added to the heated and desulfurized natural gas feed stream. The steam is preferably superheated steam at a pressure between about 15 bar to 80 bar and a temperature between about 300° C. and 600° C. and may be generated in a fired heater using a source of process steam or diverted from other portions of the system. The superheated steam is preferably added to the natural gas feed stream upstream of any pre-reformer to adjust the steam to carbon ratio and final temperature of the combined natural gas based feed stream. If required, the combined natural gas based feed stream may be further preheated to get the combined feed stream to the desired temperature. The temperature of the combined natural gas based feed stream directed to the oxygen transport membrane based reforming reactor or converter is preferably between about 300° C. and 750° C., and more preferably between about 450° C. and 600° C. The steam to carbon ratio of the combined natural gas based feed stream is preferably between about 1.0 and 2.5, and more preferably between about 1.2 and 2.2.

Air Preheat Subsystem

With reference again to FIGS. 3, 5 and 6, the air supply and preheating subsystem includes a source of feed air or other oxygen containing feed stream; an air preheater for example a continuously rotating regenerative air preheater configured to heat the source of feed air; and conduits for supplying the heated feed air stream from the regenerative air preheater to the oxygen transport membrane based reforming reactor. The air supply and preheat subsystem further includes a plurality of return conduits configured to return the heated, oxygen depleted air stream from the oxygen transport membrane based reforming reactor to the regenerative air preheater to heat the source of feed air or other oxygen containing feed stream and subsequently exhaust the cooled oxygen depleted stream.

The heated and oxygen depleted stream can optionally be introduced into a duct burner region within the return conduits which include one or more duct burners used to support combustion of a supplemental fuel stream to produce supplemental heat introduced into the continuously rotating regenerative air preheater and preheat the feed air stream. Alternatively, the duct burner may also be disposed directly in the air intake duct downstream of the heat exchanger to pre-heat the incoming feed air stream. The supplemental fuel stream can be a source of natural gas or the tail gas routed from elsewhere in the plant or a combination thereof. As described in more detail below, the preferred tail gas is typically associated with the product synthesis subsystem or hydrogen production subsystem.

The heated feed air stream is directed to the oxidant-side of the oxygen transport membrane reactor, and more particularly to the oxidant-side of the oxygen transport membrane elements or tubes within the oxygen transport membrane based reforming reactor. As the heated feed air stream flows across the oxidant-side surfaces of the oxygen transport membrane elements or tubes, oxygen ions from the heated feed air stream permeate through the oxygen transport membrane elements or tubes to the reactant side of the oxygen transport membrane elements or tubes. The oxygen ions recombine at the permeate side of the oxygen transport membrane elements or tubes and react with a hydrogen containing stream at the permeate side to create the heat and a difference in oxygen partial pressure across the oxygen transport membrane element which drives the oxygen transport.

As a result of the reactively driven oxygen ion transport across the membranes, the feed air stream becomes generally depleted of oxygen and heated by the convective heat transfer between the oxygen transport membrane elements or tubes and the passing air stream. At the high temperatures within the oxygen transport membrane based reforming reactor, approximately 70% or more of the oxygen within the feed air stream is transported or permeated across the oxygen transport membrane elements or tubes. The residual stream is thus a heated, oxygen-depleted stream that exits the oxygen transport membrane based reforming reactor and is used to preheat the incoming feed air stream, via a ceramic regenerative air preheater. The air supply and preheat subsystem may also include a blower or fan required to convey an oxygen containing feed stream through the regenerative air preheater and the downstream oxygen transport membrane reforming reactors or converters.

Oxygen Transport Membrane Based Reforming Reactor/Converter

A schematic illustration of the concept behind the first embodiment of the oxygen transport membrane based reforming reactor or converter is shown in FIG. 4. As seen in FIG. 4, the oxygen transport membrane assembly comprises an oxygen transport membrane based reforming tube where secondary reforming of the coal-derived synthesis gas occurs.

The oxygen transport membrane based reforming tube has an oxidant side and a reactive side and is capable of conducting oxygen ions at an elevated operational temperature where there is a difference in partial pressure of oxygen across the membrane. The oxidant side of the oxygen transport membrane reforming tubes is preferably the exterior surface of the ceramic tubes exposed to the heated oxygen containing stream and the reactant side or permeate side is preferably the interior surface of the ceramic tubes. Within the oxygen transport membrane reforming tube is catalysts that facilitate partial oxidation and further reforming of the coal-derived synthesis gas.

The coal-derived synthesis gas stream produced by the coal gasification subsystem generally contains hydrogen, carbon monoxide, unconverted carbon species, steam, carbon dioxide and other constituents and is directed to the reactive side of the oxygen transport membrane based reforming tube. A portion of the hydrogen and carbon monoxide within the coal-derived synthesis gas reacts with the permeated oxygen on the reactive side of the oxygen transport membrane based reforming tubes to produce heat, a portion of which is used in-situ to facilitate the conversion or further reforming of the coal-derived synthesis gas within the oxygen transport membrane based reforming tubes. In addition, a portion of the heat produced through the reaction of hydrogen with the permeated oxygen is transferred as radiant heat to adjacent process gas heating tubes.

Disposed in an adjacent or juxtaposed orientation relative to the oxygen transport membrane based reforming tube is the process gas heating tube (i.e. steam/fluid tubes). Although FIG. 4 shows a single oxygen transport membrane based reforming tube and a single process gas heating tube, there would be many of such oxygen transport membrane based reforming tubes and process gas heating tubes in each assembly or subsystem. An example of such multi-tube assembly is generally described with reference to FIG. 19 and associated detailed description in U.S. provisional patent application Ser. No. 61/932,974, the entire disclosure of which is incorporated by reference herein.

The close packing arrangement of oxygen transport membrane based reforming tubes and process gas heating tubes provides for efficient heat transfer, primarily through radiation. Such arrangement is configured to prevent overheating of the system or otherwise to manage the thermal load of the oxygen transport membrane based reforming reactors or converter. This close packing arrangement also provides advantages with respect to packing density, modularization, low cost manufacturing, shop-fab modules, and scalability of oxygen transport membrane based systems described in U.S. provisional patent application Ser. No. 61/932,974.

A schematic illustration of the concept behind a second embodiment of the oxygen transport membrane based reforming reactor or converter is shown in FIG. 7. In this embodiment, the heated feed stream comprising natural gas and steam first passes through primary reforming tubes, which contain conventional reforming catalysts configured to reform the natural gas based feed stream. The temperature of the reformed synthesis gas leaving the primary reforming tubes is designed to be between 650° C. and 850° C. This reformed synthesis gas is then fed along with the coal-derived synthesis gas to the oxygen transport membrane reforming tubes that are also filled with a reforming catalyst. Oxygen from the heated intake or feed air permeates through the oxygen transport membrane tubes and reacts with a portion of the mixed synthesis gas at the reactant side of the tubes. A portion of the energy or heat generated by this reaction is used for in-situ secondary reforming of the mixed synthesis gas. The rest of the energy or heat is transferred by radiation to the primary reforming tubes to drive the primary reforming reactions and by convection to the oxygen-depleted retentate stream. The upgraded synthesis gas leaving the oxygen transport membrane reforming tubes is preferably at a temperature between about 900° C. and about 1050° C. In other words, the endothermic heating requirements of the reforming process occurring in the primary reforming tubes is supplied through radiation of some of the heat from the oxidation reaction occurring in oxygen transport membrane reforming tubes together with the convective heat transfer provided by heated, oxygen depleted retentate stream.

The upgraded synthesis gas stream produced by the oxygen transport membrane based reforming reactor assembly or subsystem of FIG. 7 generally contains hydrogen, carbon monoxide, unconverted methane, steam, carbon dioxide and other constituents. A significant portion of the sensible heat from the upgraded synthesis gas stream can be recovered using a heat exchange section or recovery train that is designed to cool the upgraded synthesis gas stream while preheating boiler feed water as well as generating process steam. Optionally, a portion of the sensible heat may also be used to preheat the natural gas based feed stream. The resulting cooled and upgraded synthesis gas generally has a module of between about 1.7 and 1.95 and a $H_2/CO$ ratio of between about 2.5 and 4.0. This cooled and upgraded synthesis gas is suitable for use as a feed stream to the power generation subsystem and/or the Fischer-Tropsch synthesis section, described in more detail below.

Another alternate embodiment of the oxygen transport membrane based reforming reactor assembly or subsystem is shown in FIG. 8. The embodiment shown in FIG. 8 employs the same natural gas and steam conditioning process described above with reference to FIG. 7. However, in this embodiment, the natural gas based mixed feed stream containing natural gas and steam is mixed with the coal derived synthesis gas either upstream of the oxygen transport membrane reforming reactor assembly or subsystem or as the streams enter the oxygen transport membrane reforming reactor. The combined or mixed feed stream is fed to a reactant side of a reactively driven and catalyst containing oxygen transport membrane based reforming reactor assembly, generally represented as the illustrated oxygen transport membrane tube.

As with the earlier described embodiments, the reactively driven, oxygen transport membrane based reforming reactor or assembly includes one or more oxygen transport membrane tubes each having an oxidant side and a reactant side. Each of the oxygen transport membrane tubes are configured to separate oxygen from the heated feed air stream contacting the oxidant side and transport the separated oxygen to the reactant side through oxygen ion transport. The oxygen ion transport occurs when the oxygen transport membrane tubes are subjected to elevated operational temperatures and there is a difference in oxygen partial pressure across the oxygen transport membrane elements or tubes.

A portion of the hydrogen and carbon monoxide within the combined feed stream immediately reacts with the permeated oxygen at the reactant side of the tubes to produce the difference in oxygen partial pressure across the oxygen transport membrane elements which drives the oxygen ion transport and separation. This oxidation reaction also produces reaction products and heat that is used to facilitate the in-situ reforming of the combined feed stream in the presence of the reforming catalysts within the oxygen transport membrane reforming reactor or assembly. Specifically, the oxygen transport membrane based reforming reactor is configured to reform the natural gas as well as further reform any unconverted hydrocarbons from the coal-derived synthesis gas in the presence of the reaction products and heat to produce a synthesis gas product stream. The synthesis gas product stream leaving the oxygen transport membrane based reforming reactor is preferably at a temperature between about 900° C. and 1050° C.

Again, a significant portion of the sensible heat from the produced synthesis gas stream can be recovered using a heat exchange section or recovery train that is designed to cool the produced synthesis gas stream while preheating boiler feed water as well as generating process steam. Optionally, the sensible heat can be used to preheat the natural gas based feed stream. The resulting cooled oxygen transport membrane derived synthesis gas generally has a module of between about 1.95 and 2.2 and a $H_2/CO$ ratio of between about 2.7 and 4.0. This cooled oxygen transport membrane derived synthesis gas is suitable for use as a feed stream to the oxygen transport membrane based power subsystem and/or the synthesis section, described in more detail below.

As indicated above, one of the key advantages of the present systems and methods is the ability to modularize and/or scale the oxygen transport membrane based reforming reactors. In all three above-described embodiments, the oxygen transport membrane based reforming reactors are preferably arranged as sets of closely packed reforming tubes in close proximity to one another and in close proximity to the process gas heating tubes or primary reforming tubes, as the case may be. Such arrangement is generally shown and described in U.S. provisional patent application Ser. No. 61/887,751; 61/932,974 and 61/888,327 which are incorporated by reference herein.

Synthesis Gas Conditioning Subsystem

Like many IGCC systems, the present oxygen transport membrane enhanced IGCC system and process may include a water-gas shift reactor to generate additional hydrogen and carbon dioxide via the Water Gas Shift reaction: 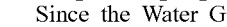
$CO+H_2O \rightarrow CO_2+H_2$ Since the Water Gas Shift reaction is exothermic, the shifted synthesis gas leaves the shift reactor at a temperature greater than the directly cooled synthesis gas, and preferably at a temperature of around 435° C. A portion of the sensible energy in this shifted stream is preferably recovered by preheating or reheating boiler feed water or by preheating the natural gas and hydrogen feed stream. Although not shown, a portion of the shifted synthesis stream may be recycled back to the oxygen transport membrane feed streams to adjust the $H_2/CO$ of the synthesis gas feed. The shifted synthesis gas is then directed to the acid gas removal (AGR) process to strip carbon dioxide from the shifted synthesis gas.

The illustrated AGR process is the Selexol™ process commercially offered by UOP, LLC, a solvent generally comprising a mixture of the dimethyl ethers of polyethylene glycol dissolves or absorbs the acid gases such as carbon dioxide from the conditioned synthetic gas at relatively high pressure, usually about 300 psia to 1000 psia. The rich solvent containing the carbon dioxide gas is then stripped to release and recover the carbon dioxide gas. The stripped carbon dioxide gas is directed to a carbon purification unit (CPU) while the remaining hydrogen-rich gas effluent is directed to the IGCC power generation subsystem. The preferred Selexol™ process is preferred for the present oxygen transport membrane enhanced IGCC process as it provides good selectivity for carbon dioxide over hydrogen contained within the synthesis gas and minimizes the need for hydrogen purification.

The CPU subsystem is configured to purify the carbon dioxide containing effluent stream and produce a purified carbon dioxide-rich stream suitable for carbon dioxide capture and storage/sequestration (CCS) processing or direct use in processes such as enhanced oil recovery. In the illustrated embodiment, the CPU subsystem first compresses the carbon dioxide-rich effluent stream to roughly 375 psia in a multi-stage compression train. The compressed carbon-dioxide-rich stream is dried in a carbon dioxide dryer which is adapted to remove excess moisture and water through a temperature swing adsorption process thereby preventing or reducing corrosion of the gas handling components. The CPU subsystem also is configured to remove undesirable impurities such as mercury and selected acids from the carbon dioxide-rich stream and may also include an auto-refrigerative process for inert removal. A typical auto-refrigerative process purifies the carbon dioxide stream to about 95% or greater purity with 97% recovery of carbon dioxide. This cryogenic based process also produces a vent stream which is enriched in atmospheric gases (e.g., $N_2$, $O_2$, Ar). The purified carbon dioxide-rich effluent stream is then further compressed to about 2000 psia.

Power Generation Subsystem

The illustrated IGCC type power generation subsystems shown in FIGS. 3, 5 and 6 provide an arrangement that supply electric power from both a hydrogen fueled gas turbine or hydrogen-rich gas fueled turbine and from steam turbine generators, as is known by those skilled in the art. An additional source of electric power is also generated in the oxygen transport membrane enhanced IGCC system as a result of the expansion of the coal-derived synthesis gas to the low to moderate pressures required by the oxygen transport membrane based reforming reactor or converter.

In the illustrated embodiments, the produced synthesis gas is cooled, cleaned and conditioned into a hydrogen-rich gaseous fuel that is directed to a suitable gas turbine. Gas turbines available from manufacturers like GE and Siemens typically need only minor modifications to use a hydrogen-rich synthesis gas as the fuel while further changes or modifications may be required to the gas turbine where hydrogen fuel is the preferred choice of fuel. Most of the sensible heat in the hot gas turbine exhaust gas is recovered in the heat recovery steam generator (HRSG) where it produces steam that drives a steam turbine in a manner or arrangement well known to those persons skilled in the art.

While the performance and overall efficiency of the synthesis gas fueled or hydrogen fueled gas turbine may be lower than comparable natural gas fueled gas turbines due to the low heating values of synthesis gas based fuels and associated temperature limitations in the synthesis gas fueled gas turbines, the environmental advantages of the IGCC powerplant are notable. Such advantages of the IGCC system or powerplant include the ability to capture and sequester carbon dioxide (i.e. CCS enabled). In addition, like other IGCC powerplants, the oxygen transport membrane enhanced IGCC system or powerplant produces very low levels of NOx, $SO_2$, particulates, and volatile mercury as the emission-forming constituents from the synthesis gas are removed prior to combustion in the IGCC power generation subsystem.

Liquid/Fuel Product Synthesis Section

Turning back to FIG. 6, the present oxygen transport membrane enhanced IGCC system and associated methods contemplate the production or synthesis of selected liquid/fuel co-products such as Fischer-Tropsch synthetic fuels or hydrogen.

Where the liquid/fuel product synthesis is a Fischer-Tropsch gas to liquid (GTL) synthesis process, the combined synthesis gas stream is synthesized into selected liquid hydrocarbon products in a Fischer-Tropsch catalyst based reactor (e.g. fixed bed reactor, slurry phase reactor, or synthol reactor) and subsequently purified into a final liquid hydrocarbon product in a manner generally known to those skilled in the art. The liquid hydrocarbon product generally produced by the Fischer-Tropsch gas to liquid (GTL) synthesis process heavily depends on temperature, catalyst, pressure and, more importantly, the synthesis gas composition.

For example, at high temperature Fischer-Tropsch reactions (i.e. 330° C.-350° C.) the liquid hydrocarbon product predominantly comprises gasoline and light olefins whereas at low temperature Fischer-Tropsch reactions (i.e. 220° C.-250° C.) the liquid hydrocarbon product predominantly comprises distillates and waxes, with some gasoline. Catalysts used in many Fischer-Tropsch gas to liquid (GTL) synthesis processes include cobalt-based catalysts or iron-based catalysts. The synthesis gas composition, and in particular, the ratio of hydrogen to carbon monoxide ($H_2$/CO ratio) is an important variable that affects the Fischer-Tropsch gas to liquid (GTL) synthesis process one that can be controlled by aspects and features of the present invention. For FT reactors using iron-based catalyst, the target H2/CO ratio is around 1:1. For FT reactors using cobalt-based catalyst, the preferred embodiment for this invention, the target H2/CO ratio is around 2:1. The FT synthesis section also generates a tail gas comprising unconverted CO & H2, H2O as well as light hydrocarbons such as methane and/or C2-C5 hydrocarbons. All or a portion of the FT tail gas may be recycled back to the oxygen transport membrane based reforming subsystem or can be used as a supplemental fuel source for the duct burner in the air intake subsystem.

Where the desired liquid/fuel product is hydrogen, the mixed stream of synthesis gas can be processed to produce a hydrogen gas product via a hydrogen product swing adsorption (PSA) process or via hydrogen membrane separation, as generally known to those skilled in the art. For example, in the hydrogen PSA based process, the mixed synthesis gas stream is first subjected to a water gas shift reaction, subsequently cooled and directed to a hydrogen pressure swing adsorption (PSA) unit which produces a higher purity hydrogen stream while the carbon oxides, methane and other impurities are rejected as a tail gas. When integrated with the embodiments of the present systems and methods, the hydrogen PSA tail gas may be recycled to use with the duct burners or other sections associated with the oxygen transport membrane based reforming subsystem while a portion of the hydrogen gas may be diverted and mixed with the natural gas feed prior to desulfurization to produce the natural gas based feed stream. Similarly, where hydrogen membrane separation process is used, a portion of the hydrogen can be used to condition the feed streams or used as a supplemental fuel source in the oxygen transport membrane based reforming subsystem.

Comparative Examples

In Tables 1 and 2, a Base Case analysis is provided in the designated column. The base case is a coal-only case, with the coal-derived synthesis gas obtained from a system generally described in the U.S. Department of Energy's "Cost and Performance Baseline for Fossil Energy Plants".

Table 1 compares the Base Case against a coal-only case of the present IGCC system with the oxygen transport membrane based reforming reactor or converter as shown and described with reference to FIG. 3 and FIG. 4, referred to in Table 1 as Case 2. In Case 2, the specific oxygen is reduced to the gasifier and the coal split is adjusted between the two stages. Due to the reduced temperature of the second stage in the gasifier, the methane slip increases significantly in this case. Through the addition of the oxygen transport membrane based reforming reactor of converter to the cycle, additional non-cryogenically produced oxygen is provided to the coal-derived synthesis gas stream and a significant portion of the methane slip is reacted in the secondary reforming step to liberate carbon monoxide and hydrogen which is convertible to power with carbon dioxide capture.

When comparing the Base Case with the Case 2, the present IGCC system with the oxygen transport membrane based reforming reactor or converter provides the following benefits and advantages:

For the same overall specific oxygen, roughly 90% is cryogenically produced and 10% is provided by through the oxygen transport membrane elements. Relative to a unit of hydrogen available to the gas turbines, the cryogenically produced oxygen is reduced by about 30% versus the Base Case. This results in a large reduction in parasitic power to operate the air separation unit (ASU), and more power available as useful plant output.

The corresponding carbon (in the coal) conversion to carbon monoxide increases from about 60% in the Base Case to about 75% in the oxygen transport membrane based reforming reactor or converter case. This increase in carbon monoxide represents more opportunity for hydrogen fuel to the gas turbines, and less carbon dioxide or unreacted methane passing through to capture. In fact, the methane slip is reduced by over 90% from the reduced-oxygen gasifier synthesis gas and about 85% from the Base Case synthesis gas. In addition, there is an increase in synthesis gas $CO/CO_2$ ratio of about 70%. With the increase in carbon conversion to carbon monoxide and the resultant increase in hydrogen available to the gas turbines per unit of carbon input, there is an overall 20% reduction of carbon dioxide produced by the powerplant with an oxygen transport membrane based converter.

TABLE 1

|  | Base Case IGCC | Case 2 IGCC w/OTM Converter | |
|---|---|---|---|
|  | Gasifier Out | Gasifier Out | OTM Out |
| % Heating Value from NG | 0.0% | 0.0% | |
| scf NG/lb Dry Coal | 0.0 | 0.0 | |
| Pressure (bar abs) | 43 | 43 | 43 |
| $O_2$/C Ratio | 0.46 | 0.41 | 0.46 |
| $H_2O$/C Ratio | 0.68 | 0.68 | 0.68 |
| $CO/CO_2$ Ratio | 1.90 | 1.60 | 3.20 |
| $H_2$/CO Ratio | 0.91 | 0.88 | 0.92 |
| C to CO Conversion | 60% | 52% | 75% |
| $H_2$ Fuel/Unit Carbon In | 1.13 | 0.98 | 1.44 |
| C Converted/Unit Carbon In | 80% | 75% | 87% |
| Cryo $O_2$/Total $O_2$ | 100% | 90% | 10% |
| $CO_2$/Unit $H_2$ Fuel | 0.41 | 0.42 | 0.21 |
| $CO_2$ Produced $CO_2/CO_{2\,base}$ | 100% | 116% | 79% |
| Fischer-Tropsch Adjustment | 0.64 | 0.63 | 0.64 |
| $N_2$ (Vol %) | 3.4 | 3.7 | 3.2 |
| $O_2$ (Vol %) | 0.0 | 0.0 | 0.0 |
| $H_2$ (Vol %) | 27.1 | 24.6 | 32.3 |
| $H_2O$ (Vol %) | 19.1 | 18.0 | 17.8 |
| CO (Vol %) | 30.0 | 27.9 | 35.1 |
| $CO_2$ (Vol %) | 15.8 | 17.5 | 11.0 |
| $CH_4$ (Vol %) | 4.6 | 8.2 | 0.7 |

Table 2 compares the Base Case against the embodiment of the present oxygen transport membrane enhanced IGCC system using coal and natural gas with the oxygen transport membrane based reforming reactor or converter as shown and described with reference to FIG. 5, referred to in Table 2 as Case 3. In Case 3, natural gas is supplied such that it comprises approximately 50% of the fuel heating value to the IGCC oxygen transport membrane enhanced plant. Table 2 also compares the Base Case to the oxygen transport membrane enhanced IGCC system configured to support co-product generation, and in particular Fischer-Tropsch synthesis, shown and described with reference to FIG. 6, and is referred to as Case 4.

The oxygen transport membrane enhanced IGCC system with both coal and natural gas feeds and the oxygen transport membrane based reforming reactor provides significant advantages when compared to the Base Case. For example, the methane slip in both Case 3 and Case 4 is reduced by over 90% from the methane slip in the Case 2 synthesis gas, and about 85% from the methane slip in the Base Case synthesis gas. With respect to specific oxygen input for Case 3, about 50% of the oxygen is cryogenically-derived while about 50% is provided by through oxygen transport membranes. Relative to a unit of hydrogen available to the gas turbines, the cryogenically produced oxygen is reduced by 65% versus the base case. This results in a large reduction in parasitic power to operate the ASU, and more power available as useful plant output. In addition, the capacity of the ASU can be dramatically reduced which results in a capital cost savings compared to the Base Case.

Also, the hydrogen available as a fuel to the gas turbine relative to a unit of carbon input increases from about 1.13 in the Base Case to about 1.86 in Case 3. This represents an increase of 43% over the Base Case and 30% increase over Case 2. This hydrogen fuel increase represents a progressively lower carbon input required for the same required power for the plant. Put another way, there is roughly a 40% reduction in carbon dioxide produced for Case 3 versus the Base Case.

In Case 4, when the upgraded or combined synthesis gas is specifically adapted to achieve the desired characteristics to support Fischer-Tropsch synthesis, there is a slight loss of efficiency. In the Base Case, only 64% of the synthesis gas produced can be adjusted to achieve the desired ratio. The remaining 36% is preferably used to provide the hydrogen input for the ratio adjustment. For Case 2 (See Table 1) this efficiency does not improve because it is restricted to the inherent hydrogen-to-carbon ratio of the fuel and $H_2O$/carbon ratio of the conversion.

However, with the addition of natural gas (e.g. about 50% by heating value) as suggested in Case 3, the efficiency for downstream Fischer-Tropsch synthesis can be increased to about 87%. By further increasing the natural gas feed or input to approximately 70% by heating value as suggested by Case 4, no hydrogen adjustment is required, and 100% of the produced synthesis gas may be used for Fischer-Tropsch synthesis.

TABLE 2

|  | Base Case IGCC | Case 3 IGCC w/Natural Gas | | Case 4 IGCC w/Natural Gas | |
|---|---|---|---|---|---|
|  | Gasifier Out | Gasifier Out | OTM Out | Gasifier Out | OTM Out |
| % Heating Value from NG | 0.0% | 49.9% | | 70.6% | |
| scf NG/lb Dry Coal | 0.0 | 13.6 | | 32.8 | |
| Pressure (bar abs) | 43 | 43 | 30 | 43 | 30 |
| $O_2$/C Ratio | 0.46 | 0.41 | 0.51 | 0.41 | 0.54 |
| $H_2O$/C Ratio | 0.68 | 0.68 | 0.99 | 0.68 | 1.17 |
| $CO/CO_2$ Ratio | 1.90 | 1.60 | 2.65 | 1.60 | 2.50 |
| $H_2$/CO Ratio | 0.91 | 0.88 | 1.60 | 0.88 | 2.00 |
| C to CO Conversion | 60% | 52% | 71% | 52% | 70% |
| $H_2$ Fuel/Unit Carbon In | 1.13 | 0.98 | 1.86 | 0.98 | 2.10 |
| C Converted/Unit Carbon In | 80% | 75% | 87% | 75% | 87% |
| Cryo $O_2$/Total $O_2$ | 100% | 50% | 50% | 31% | 69% |
| $CO_2$/Unit $H_2$ Fuel | 0.41 | 0.42 | 0.14 | 0.42 | 0.08 |
| $CO_2$ Produced (vs Base) | 100% | 116% | 61% | 116% | 54% |

TABLE 2-continued

|  | Base Case IGCC | Case 3 IGCC w/Natural Gas | | Case 4 IGCC w/Natural Gas | |
| --- | --- | --- | --- | --- | --- |
|  | Gasifier Out | Gasifier Out | OTM Out | Gasifier Out | OTM Out |
| FT Adjustment | 0.64 | 0.63 | 0.87 | 0.63 | 1.00 |
| $N_2$ (Vol %) | 3.4 | 3.7 | 1.6 | 3.7 | 1.1 |
| $O_2$ (Vol %) | 0.0 | 0.0 | 0.0 | 0.0 | 0.0 |
| $H_2$ (Vol %) | 27.1 | 24.6 | 38.8 | 24.6 | 40.9 |
| $H_2O$ (Vol %) | 19.1 | 18.0 | 25.7 | 18.0 | 28.8 |
| CO (Vol %) | 30.0 | 27.9 | 24.2 | 27.9 | 20.5 |
| $CO_2$ (Vol %) | 15.8 | 17.5 | 9.1 | 17.5 | 8.2 |
| $CH_4$ (Vol %) | 4.6 | 8.2 | 0.6 | 8.2 | 0.5 |

While the inventions herein disclosed have been described by means of specific embodiments and processes associated therewith, numerous modifications and variations can be made thereto by those skilled in the art without departing from the scope of the invention as set forth in the appended claims or sacrificing all of its features and advantages.

The invention claimed is:

1. An oxygen transport membrane based hydrogen-rich fuel gas production system comprising:
a coal gasification subsystem configured to produce a coal-derived synthesis gas stream from a source of coal, steam and a first oxygen stream;
an oxygen transport membrane based conversion subsystem configured to treat the coal-derived synthesis gas stream with at least a second oxygen stream to form a hydrogen-rich effluent stream, wherein said oxygen transport membrane-based conversion subsystem comprises
an oxygen transport membrane reforming reactor comprising an oxygen transport membrane element having an oxidant side and a reactive side, the oxygen transport membrane element configured to transport oxygen ions at an elevated operational temperature where there is a difference in partial pressure of oxygen across the membrane element;
a source of low pressure feed air in fluid communication with the oxidant side of the oxygen transport membrane element;
a source of coal-derived synthesis gas in fluid communication with the reactive side of the oxygen transport membrane element;
optionally a source of natural gas and steam in fluid communication with the reactive side of the oxygen transport membrane element; and
a reforming catalyst disposed at or proximate to the reactive side of the oxygen transport membrane element;
wherein oxygen from the feed air permeates through the oxygen transport membrane element and reacts with a portion of the coal-derived synthesis gas at the reactant side of the oxygen transport membrane element to produce reaction products and heat;
wherein the oxygen transport membrane based reforming reactor assembly is further configured to reform unconverted hydrocarbons in the coal-derived synthesis gas and/or said optional natural gas in the presence of the steam, a portion of the heat and the catalyst to produce a hydrogen-rich effluent stream;
a gas conditioning subsystem configured to treat the hydrogen-rich effluent stream to produce the hydrogen-rich fuel gas;
wherein the first oxygen stream is provided by separation of oxygen from air at cryogenic temperatures and the second oxygen stream is provided by separation of oxygen from air at elevated temperatures within the oxygen transport membrane based conversion subsystem; and
wherein the mass of the second oxygen stream divided by the total mass of the first and second oxygen streams is in the range of 0.1 to 0.7.

2. The system of claim 1 wherein the hydrogen-rich fuel gas is provided as a fuel to a gas turbine to generate electricity.

3. The system of claim 1 wherein the hydrogen-rich fuel gas is divided into at least a first portion and a second portion, the first portion provided to a gas turbine to generate electricity, and the second portion provided as a source of hydrogen in other industrial applications.

4. The system of claim 1 wherein the gas conditioning subsystem produces a carbon dioxide rich stream and the hydrogen-rich fuel gas.

5. The system of claim 2 wherein a nitrogen rich stream formed while separating oxygen from air at cryogenic temperature is provided to the gas turbine as a diluent.

6. The system of claim 5 wherein the coal-derived synthesis gas stream contains at least 5.0 volume % hydrocarbons and the hydrogen-rich synthesis gas stream contains less than about 2.0 volume % hydrocarbons.

* * * * *